Patented July 13, 1943

2,324,368

UNITED STATES PATENT OFFICE 2,324,368

REACTION PRODUCT OF ALDEHYDES AND BIS-(DIAMINO DIAZINYL) CYANOALKYLENE DISULPHIDES

Gaetano F. D'Alelio and James W. Underwood, Pittsfield, Mass., assignors to General Electric Company, a corporation of New York No Drawing. Application March 26, 1942,
Serial No. 436,248

20 Claims. (Cl. 260—42)

This invention relates to the production of new synthetic materials and more particularly to new reaction products of particular utility in the plastics and coating arts. Specfically the invention is concerned with compositions of matter comprising a condensation product of ingredients comprising an aldehyde, including polymeric aldehydes and aldehyde-addition products, e. g., formaldehyde, paraformaldehyde, dimethylol urea, trimethylol melamine, etc., and a compound corresponding to the following general formula:

I
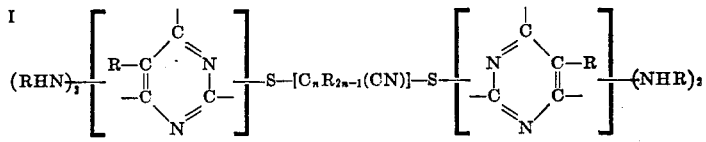

Instead of the primidine (1,3-diazine) compounds represented by the above formula, corresponding derivatives of the 1,2-diazines or of the 1,4-diazines may be used.

phenylethyl, phenylisopropyl, cinnamyl, etc.); and their homologues, as well as those groups with one or more of their hydrogen atoms substituted by, for example, a halogen, more particularly chlorine, bromine, fluorine or iodine. Specific examples of halogeno-substituted hydrocarbon radicals are chloromethyl, chloroethyl, chlorophenyl, dichlorophenyl, chlorocyclohexyl, ethyl chlorophenyl, phenyl chloroethyl, bromoethyl, bromopropyl, bromotolyl, iodophenyl, etc. Preferably R in Formula I is hydrogen. However, there also may be used in carrying the present invention into effect compounds such, for instance, as those represented by the general formulas:

II
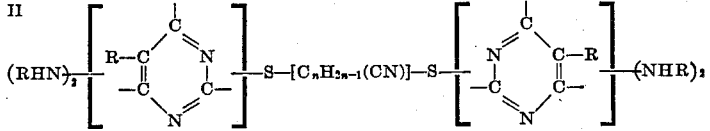

and, more particularly,

III
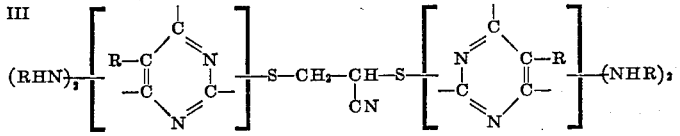

In the above formula $n$ represents an integer and is at least 1 and not more than 2 and R represents a member of the class consisting of hydrogen and monovalent hydrocarbon and substituted hydrocarbon radicals, more particularly halo-hydrocarbon radicals. Illustrative examples of radicals that R in Formula I may represent are: aliphatic (e. g., methyl, ethyl, propyl, isopropyl, butyl, secondary butyl, butenyl, isobutyl, amyl, isoamyl, hexyl, etc.), including cycloaliphatic (e. g., cyclopentyl, cyclopentenyl, cyclohexyl, cyclohexenyl, cycloheptyl, etc.); aryl (e. g., phenyl, diphenyl or xenyl, naphthyl, etc.); aliphatic-substituted aryl (e. g., tolyl, xylyl, ethylphenyl, propylphenyl, isopropylphenyl, allylphenyl, 2-butenylphenyl, tertiary-butylphenyl, etc.); aryl-substituted aliphatic (e. g., benzyl, where $n$ and R have the same meanings as above given with reference to Formula I.

The bis-(diamino diazinyl) cyanoalkylene (including cyanoalkylidene) disulphides used in carrying the present invention into effect are more fully described and are specifically claimed in our copending application Serial No. 436,249, filed concurrently herewith and assigned to the same assignee as the present invention. As pointed out in this copending application, such disulphides can be prepared by effecting reaction between a diamino [(—NHR)₂] mercapto pyrimidine and a di-halogenated alkyl cyanide (di-halogenated cyano-alkane in the presence of a hydrohalide acceptor, e. g., an alkali-metal hydroxide, the reactants being employed in the ratio of two mols of the diamino mercapto pyrimidine per mol of the di-halogenated alkyl cyanide.

Specific examples of disulphides that may be used in producing our new condensation products are listed below:

Alpha, beta-bis-(4,6-diamino pyrimidyl-2) cyanoethylene disulphide
Alpha, beta-bis-(2,6- diamino pyrimidyl-4) cyanoethylene disulphide
Bis-(2,6-diamino pyrimidyl-4) cyanomethylene disulphide
Beta, beta-bis-(4,6-diamono pyrimidyl-2) cyanoethylidene disulphide
Beta, beta-bis-(2,6-diamino pyrimidyl-4) cyanoethylidene disulphide
Bis-(4-amino 6-methylamino pyrimidyl-2) cyanomethylene disulphide
Bis-[4,6-di-(methylamino) pyrimidyl-2] cyanomethylene disulphide
Alpha, alpha-bis-(4,6-diamino pyrimidyl-2) cyanoethylidene disulphide
Alpha, alpha-bis-(2,6-diamino pyrimidyl-4) cyanoethylidene disulphide
Beta-phenyl alpha, alpha-bis-(4-pentylamino 5-methyl 6-ethylamino pyrimidyl-2) cyanoethylidene disulphide
Beta, beta-bis-(4,6-diamino pyrimidyl-2) cyanopropylidene disulphide
Beta, beta-bis-(2,6-diamino pyrimidyl-4) cyanopropylidene disulphide
Alpha, beta-bis-(4,6-diamino pyrimidyl-2) cyanoproplyene disulphide
Alpha, beta-bis-(2,6-diamino pyrimidyl-4) cyanopropylene disulphide
Alpha-methyl beta, beta-bis-(4,6-dianilino 5-phenyl pyrimidyl-2) cyanopropylidene disulphide
Alpha, beta-dimethyl alpha, beta-bis-(4-xylidino 5-benzyl 6-amino pyrimidyl-2) cyanoproplyene disulphide
Alpha-butyl alpha, beta-bis-(2-amino 5-cyclohexyl 6-naphthylamino pyrimidyl-4) cyanoethylene disulphide
Alpha-cyclopentyl beta-phenyl alpha, beta-bis-(2-methylamino 5-naphthyl 6-isoproplyamino pyrimidyl-4) cyanoethylene disulphide
Alpha, beta-di-chlorophenyl) alpha, beta-bis-(diamino pyrimidyl) cyanoethylene disulphide
Beta-benzyl alpha, alpha-bis-(2,6-diamino 5-xylyl pyrimidyl-4) cyanopropylidene disulphide
Tolyl bis-(4-anilino 6-methylamino pyrimidyl-2) cyanomethylene disulphide
Phenyl bis-(diamino pyrimidyl) cyanomethylene disulphide
Chlorophenyl bis-(diamino pyrimidyl) cyanomethylene disulphide
Bromotolyl bis-(diamino pyrimidyl) cyanomethylene disulphide
Iodophenyl bis-(diamino pyrimidyl) cyanomethylene disulphide
Alpha-benzyl alpha, beta-bis-(4,6-diamino 5-methyl pyrimidyl-2) cyanoethylene disulphide
Alpha-butyl alpha, beta-bis-(2,6-diamino 5-methyl pyrimidyl-4) cyanoethylene disulphide
Alpha, beta-dimethyl alpha, beta-bis-(4-cyclopentylamino 5-methyl 6-toluido pyrimidyl-2) cyanoethylene disulphide
Alpha, beta-diethyl alpha, beta-bis-(2-fluoroanilino 5-tolyl 6-toluido pyrimidyl-4) cyanoethylene disulphide
Alpha-methyl alpha, beta-bis-(4-benzylamino 5-chlorophenyl 6-amino-pyrimidyl-2) cyanoethylene disulphide
Alpha, beta-dipropyl alpha, beta-bis-(4-iodoanilino 6-toluido pyrimidyl-2) cyanoethylene disulphide
Beta-phenyl alpha, beta-bis-[2,6-di-(methylamino) 5-cyclohexyl pyrimdyl-4] cyanoethylene disulphide
Beta-phenyl alpha, beta-bis-(diamino pyrimidyl) cyanoethylene disulphide
Beta-tolyl alpha, beta-bis-(diamino pyrimidyl) cyanoethylene disulphide
Beta-cyclohexyl alpha, beta-bis-(diamino pyrimidyl) cyanoethylene disulphide
Beta-cyclohexenyl alpha, beta-bis-(diamino pyrimidyl) cyanoethylene disulphide
Alpha-(2-butenylphenyl) alpha, beta-bis-(diamino pyrimidyl) cyanoethylene disulphide
Bis-[di-(naphthylamino) pyrimidyl] cyanomethylene disulphide
Alpha, beta-bis-[4,6-di-(allylamino) pyrimidyl-2] cyanoethylene disulphide
Alpha, beta-bis-[4,6-di-(bromoethylamino) pyrimidyl-2] cyanoethylene disulphide
Bis-(2-amino 6-ethylamino pyrimidyl-4) cyanoethylene disulphide
Beta-tolyl alpha, alpha-bis-(diamino pyrimidyl) cyanoethylidene disulphide
Alpha, beta-bis-(diamino pyrimidyl) cyanobutylene disulphide
Alpha, alpha-bis-(diamino pyrimidyl) cyanobutylidene disulphide
Beta, beta-bis-(diamino pyrimidyl) cyanobutylidene disulphide
Alpha, beta-bis-(diamino pyrimidyl) cyanopentylene disulphide
Alpha, beta-bis-(diamino pyrimidyl) cyanohexylene disulphide
Alpha, beta-bis-(diamino pyrimidyl) cyanoheptylene disulphide It will be understood, of course, by those skilled in the art that "diamino pyrimidyl" as used broadly in naming some of the above-mentioned compounds includes within its meaning both the bis-(4,6-diamino pyrimidyl-2) and the bis-(2,6-diamino pyrimidyl-4) [bis-(2,4-diamino pyrimidyl-6)] compounds.

Additional examples of disulphides that may be employed in producing the new condensation products of the present invention are given in our above-identified copending application Serial No. 436,249.

The present invention is based on our discovery that new and valuable materials of particular utility in the plastics and coating arts can be produced by effecting reaction between ingredients comprising essentially an aldehyde, including polymeric aldehydes, hydroxyaldehydes and aldehyde-addition products, and a bis-(diamino diazinyl), more particularly a bis-(diamino pyrimidyl), cyanoalkylene (including cyano alkylidene) disulphide. The cured resins are outstanding in their resistance to water and organic solvents. They have good curing characteristics and excellent resistance to heat and abrasion. They also have a high dielectric strength. These improved properties make the products of the present invention suitable for use in fields of utility, for instance in electrically insulating applications, for which resinous materials of lesser resistance to heat, water, abrasion and organic solvents would be wholly unsuited.

Resins heretofore have been made by condensing an aldehyde with an aminopyrimidine thioether, but such resins are not entirely satisfactory from the standpoint of optimum heat- and abrasion-resistance and in curing characteristics. One possible explanation for these deficiencies in desirable properties is the fact that the starting material contains thio groups that are aldehyde-non-reactable. In marked contrast the starting disulphides used in practicing this invention contain an aldehyde-reactable group attached to two sulphur atoms, each of which is linked to a diamino [(—NHR)$_2$] diazine nucleus, thereby imparting to the condensation products of such disulphides with aldehydes increased heat- and abrasion-resistance and improved curing characteristics as compared with resinous condensation products of an aldehyde and an aminopyrimidine thioether.

In practicing our invention the initial condensation reaction may be carried out at normal or at elevated temperatures, at atmospheric, subatmospheric or superatmospheric pressures, and under neutral, alkaline or acid conditions. Preferably the reaction between the components is initiated under alkaline conditions.

Any substance yielding an alkaline or an acid aqueous solution may be used in obtaining alkaline or acid conditions for the initial condensation reaction. For example, we may use an alkaline substance such as sodium, potassium or calcium hydroxides, sodium or potassium carbonates, mono-, di- or tri-amines, etc. In some cases it is desirable to cause the initial condensation reaction to take place in the presence of a primary condensation catalyst and a secondary condensation catalyst. The primary catalyst advantageously is either an aldehyde-non-reactably nitrogen-containing basic tertiary compound, e. g., tertiary amines such as trialkyl (e. g., trimethyl, triethyl, etc.) amines, triaryl (e. g., triphenyl, tritolyl, etc.) amines, etc., or an aldehyde-reactable nitrogen-containing basic compound, for instance ammonia, primary amines (e. g., ethyl amine, propyl amine, etc.) and secondary amines (e. g., dipropyl amine, dibutyl amine, etc.). The secondary condensation catalyst, which ordinarily is used in an amount less than the amount of the primary catalyst, advantageously is a fixed alkali, for instance a carbonate, cyanide or hydroxide of an alkali metal (e. g., sodium, potassium, lithium, etc.).

Illustrative examples of acid condensation catalysts that may be employed are inorganic or organic acids such as hydrochloric, sulphuric, phosphoric, acetic, lactic, acrylic, malonic, etc., or acid salts such as sodium acid sulphate, monosodium phosphate, monosodium phthalate, etc. Mixtures of acids, of acid salts or of acids and of acid salts may be employed if desired.

The reaction between the aldehyde, e. g., formaldehyde, and the bis-(diamino diazinyl) cyanoalkylene disulphide may be carried out in the presence of solvents or diluents, fillers, other natural or synthetic resinous bodies, or while admixed with other materials that also can react with the aldehydic material or with the disulphide, e. g., ketones, urea (NH$_2$CONH$_2$), thiourea, selenourea, iminourea (guanidine), substituted ureas, thioureas, selenoureas and iminoureas, numerous examples of which are given in various copending applications of one of us, for instance in D'Alelio copending application Serial No. 363,037, filed October 28, 1940; monoamides of monocarboxylic and polycarboxylic acids and polyamides of polycarboxylic acids, e. g., acetamide, halogenated acetamides (e. g., a chlorinated acetamide), maleic monoamide, malonic monoamide, phthalic monoamide, maleic diamide, fumaric diamide, malonic diamide, itaconic diamide, succinic diamide, phthalic diamide, the monamide, diamide and triamide of tricarballylic acid, etc.; aminodiazines other than the bis-(diamino diazinyl) cyanoalkylene disulphides, e. g., 2,4,6-triamino pyrimidine, etc.; aminotriazines, e. g., melamine, ammeline, ammelide, melem, melam, melon, numerous other examples being given in various copending applications of one of us, for instance in D'Alelio copending application Serial No. 377,524, filed February 5, 1941, and in applications referred to in said copending application; phenol and substituted phenols, e. g., cresols, the xylenols, the tertiary alkyl phenols and other phenols such as mentioned in D'Alelio Patent No. 2,239,441; monohydric and polyhydric alcohols, e. g., butyl alcohol, amyl alcohol, ethylene glycol, glycerine, polyvinyl alcohol, etc.; amines, including aromatic amines, e. g., aniline, etc.

The modifying reactants may be incorporated with the cyanoalkylene disulphide and the aldehyde by mixing all the reactants and effecting condensation therebetween or by various permutations of reactants as described, for example, in D'Alelio and Holmes Patent No. 2,263,289 with particular reference to reactions involving a non-nitrated urea, an aliphatic aldehyde and a nitrated urea, specifically nitrourea (page 2, column 1, lines 71–75, column 2, lines 1–22). For instance, we may form a partial condensation product of ingredients comprising (1) urea or melamine or urea and melamine, (2) a disulphide of the kind herein described, for example a bis-(diamino pyrimidyl) cyanomethylene disulphide, specifically bis-(4,6-diamino pyrimidyl-2) cyanomethylene disulphide, a bis-(diamino pyrimidyl) cyanoethylene disulphide, more particularly alpha, beta-bis-(4,6-diamino pyrimidyl-2) cyanoethylene disulphide, alpha, beta-bis-(2,6-diamino pyrimidyl-4) cyanoethylene disulphide, etc., and (3) an aldehyde, including polymeric aldehydes, hydroxyaldehydes and aldehyde-addition products, for instance formaldehyde, paraformaldehyde, glyceraldehyde, dimethylol urea, a polymethylol melamine, etc. Thereafter we may effect reaction between this partial condensation product and, for example, a curing reactant, specifically a chlorinated acetamide, to obtain a heat-curable composition. The curing reactant accelerates the cure of the resin and improves its resistance to water. Direct or active curing catalysts and latent curing catalysts also accelerate the conversion of the heat-convertible or potentially heat-convertible resin to a cured state and improve its water resistance. The curing agent may be omitted, if desired, when rapidity of cure of the thermosetting resin and the water resistance of the cured resin are of secondary consideration.

Some of the condensation products of this invention are thermoplastic materials even at an advanced stage of condensation, while others are thermosetting or potentially thermosetting bodies that convert under heat or under heat and pressure to an insoluble, infusible state. The thermoplastic condensation products are of particular value as plasticizers for other synthetic resins. The thermosetting or potentially thermosetting condensation products, alone or mixed with fillers, pigments, dyes, lubricants, plasticizers, curing agents, etc., may be used, for example, in the production of molding compositions.

The heat-curable resinous condensation products of this invention show excellent flow characteristics during a short curing cycle. This is a property that is particularly desirable in a molding compound. The molded articles have a high dielectric strength and excellent resistance to arcing. They have an excellent surface finish and exceptionally high resistance to water, organic solvents and abrasion.

The liquid intermediate condensation products may be concentrated or diluted further by the removal or addition of volatile solvents to form liquid coating compositions of adjusted viscosity and concentrations. The heat-convertible or potentially heat-convertible resinous condensation products may be used in liquid state, for instance as surface-coating materials, in the production of paints, varnishes, lacquers, enamels, etc., for general adhesive applications, in producing laminated articles and for numerous other purposes. The liquid heat-hardenable or potentially heat-hardenable condensation products also may be used directly as casting resins, while those which are of a gel-like nature in partially condensed state may be dried and granulated to form clear, unfilled heat-convertible resins.

In order that those skilled in the art better may understand how the present invention may be carried into effect the following illustrative examples thereof are given. All parts are by weight.

Example 1

| | Parts |
|---|---|
| Alpha, beta-bis-(4,6-diamino pyrimidyl-2) cyanoethylene disulphide | 50.0 |
| Aqueous formaldehyde (approx. 37.1% HCHO) | 61.0 |
| Aqueous ammonia (approx. 28% NH$_3$) | 5.0 |
| Aqueous solution of sodium hydroxide (0.46 N) | 3.0 |
| Chloroacetamide (monochloroacetamide) | 2.0 |

All of the above components with the exception of the chloroacetamide were heated together under reflux at the boiling temperature of the mass for 20 minutes. The chloroacetamide was now added and the resulting resinous syrup immediately was mixed with 40 parts alpha cellulose in flock form and 1 part of a mold lubricant, specifically zinc stearate, to form a molding composition. The wet molding compound was dried at 60° C. until sufficient moisture had been removed to provide a material that could be molded satisfactorily. A well-cured molded article having a well-knit and homogeneous structure was obtained by molding a sample of the dried and ground molding compound for 3 minutes at 135° C. under a pressure of 2,000 pounds per square inch. The molding compound showed good plastic flow during molding.

Instead of using chloroacetamide as above described in accelerating the curing of the potentially reactive resinous material, heat-convertible compositions may be produced by adding to the syrup direct or active curing catalysts (e. g., citric acid, phthalic anhydride, malonic acid, oxalic acid, etc.), or latent curing catalysts (e. g., sodium chloroacetate, N-diethyl chloroacetamide, glycine ethyl ester hydrochloride, etc.), or by intercondensation with curing reactants other than monochloroacetamide (e. g., di- and tri-chloroacetamides, chloroacetonitriles, alpha, beta-dibromopropionitrile, aminoacetamide hydrochloride, aminoacetonitrile hydrochloride, ethylene diamine monohydrochloride, diethanolamine hydrochloride, nitrourea, chloroacetyl urea, chloroacetone, glycine, sulphamic acid, citric diamide, phenacyl chloride, etc.). Other examples of active and latent curing catalysts and of curing reactants that may be employed to accelerate or to effect the curing of the thermosetting or potentially thermosetting resins of this and other examples are given in various D'Alelio copending applications, for instance in copending applications Serial No. 346,962, filed July 23, 1940, and Serial No. 354,395, filed August 27, 1940, both of which applications are assigned to the same assignee as the present invention.

Example 2

| | Parts |
|---|---|
| Alpha, beta-bis-(4,6-diamino pyrimidyl-2) cyanoethylene disulphide | 34.0 |
| Urea | 24.0 |
| Aqueous formaldehyde (approx. 37.1% HCHO) | 202.0 |
| Aqueous ammonia (approx. 28% NH$_3$) | 6.0 |
| Aqueous solution of sodium hydroxide (0.46 N) | 7.0 |
| Chloroacetamide | 1.3 |

All of the above components with the exception of the chloroacetamide were heated together under reflux at boiling temperature for 15 minutes. The chloroacetamide was now added and refluxing was continued for an additional 5 minutes to cause the chloroacetamide to intercondense with the cyanoethylene disulphide-urea-formaldehyde partial condensation product. The resulting resinous syrup was mixed with 90 parts alpha cellulose and 1 part zinc stearate to form a molding compound. The wet compound was dried as described under Example 1, after which a sample of the dried and ground composition was molded using the same time, temperature and pressure conditions described under Example 1. A well-cured molded product having a well-knit and homogeneous structure was obtained. The molding composition showed good flow characteristics during molding.

Example 3

| | Parts |
|---|---|
| Alpha, beta-bis-(4,6-diamino pyrimidyl-2) cyanoethylene disulphide | 67 |
| Para-toluene sulphonamide | 9 |
| Aqueous formaldehyde (approx. 37.1% HCHO) | 102 |
| Aqueous solution of sodium hydroxide (0.46 N) | 5 |
| Chloroacetamide | 1 |

All of the above ingredients with the exception of the chloroacetamide were heated together under reflux at boiling temperature for 20 minutes. The chloroacetamide was now added and refluxing was continued for an additional 5 minutes. A molding compound was prepared by mixing the resulting resinous syrup with 62 parts alpha cellulose and 1 part zinc stearate. The wet molding compound was dried at room temperature for approximately 16 hours. A sample of the dried and ground molding compound was molded for 3 minutes at 135° C. under a pressure of 2,000 pounds per square inch. The molded piece was extracted hot from the mold and did not warp or become distorted upon cooling to room temperature. It was well cured throughout and had an exceedingly well-knit structure. The molding compound showed excellent plastic flow during molding, being somewhat better in this respect than compositions similarly made from resins of this same kind but which had not been modified with para-toluene sulphonamide.

Example 4

| | Parts |
|---|---|
| Alpha, beta-bis-(4,6-diamino pyrimidyl-2) cyanoethylene disulphide | 84.0 |
| Dimethylol urea (commercial grade containing approx. 11% by weight of water) | 178.0 |
| Aqueous ammonia (approx. 28% $NH_3$) | 8.0 |
| Aqueous solution of sodium hydroxide (0.46 N) | 8.0 |
| Water | 330.0 |
| Chloroacetamide | 1.5 |

A resinous syrup was produced by refluxing all of the above components with the exception of the chloroacetamide at boiling temperature for 20 minutes. The chloroacetamide was now added and refluxing was continued for a period sufficient to cause the chloroacetamide to go into solution. A molding compound was prepared by mixing the resulting resinous syrup with 90 parts alpha cellulose and 1 part zinc stearate. The wet molding composition was dried at 60° C. as described under Example 1. A well-molded product was obtained by molding a sample of the dried and ground molding compound under heat and pressure as described in the preceding examples.

Example 5

A phenolic resin syrup was prepared by heating the following components for 4 hours at 65° C.

| | Parts |
|---|---|
| Phenol | 90.0 |
| Aqueous formaldehyde (approx. 37.1% HCHO) | 195.0 |
| Potassium carbonate | 2.85 |

The phenol-formaldehyde liquid partial condensation product prepared in this manner is described in the following formula as "syrupy phenolic resin."

| | Parts |
|---|---|
| Syrupy phenolic resin | 60.0 |
| Alpha, beta bis-(4,6-diamino pyrimidyl-2) cyanoethylene disulphide | 1.9 |
| Oxalic acid | 1.1 |
| Aqueous solution of sodium hydroxide (0.46 N) | Trace |

All of the above ingredients with the exception of the oxalic acid were heated together under reflux at boiling temperature for 30 minutes. The oxalic acid was now added and the resulting syrupy condensation product immediately was mixed with 23.2 parts alpha cellulose and 0.2 part zinc stearate to form a molding compound. The wet molding composition was dried at 60° C. as described under Example 1. A well-cured molded piece was produced by molding a sample of the dried and ground molding compound for 3 minutes at 135° C. under a pressure of 2,000 pound per square inch. The molded piece was very resistant to water and had good cohesive characteristics. The molding compound showed very good flow characteristics during molding.

Example 6

| | Parts |
|---|---|
| Alpha, beta-bis-(4,6-diamino pyrimidyl-2) cyanoethylene disulphide | 12.6 |
| Acrolein | 10.5 |
| Aqueous solution of sodium hydroxide (0.46 N) | 0.5 |
| Water | 20.0 | were heated together under reflux at boiling temperature for 6 minutes, at the end of which period of time a resinous layer separated from the reaction mass. The aqueous liquid layer had sufficient resin dissolved therein to test the curing characteristics of the dissolved resin. Samples of the aqueous resin, to which monochloroacetamide, trichloroacetamide, sulphamic acid, polysalicylide and other curing agents such as mentioned under Example 1 had been added, were heated on a 140° C. hot plate. The resin cured at this temperature to an insoluble and infusible state. The resinous material of this example, with or without various curing agents, may be used in the production of molding compounds.

Example 7

| | Parts |
|---|---|
| Alpha, beta-bis-(4,6-diamino pyrimidyl - 2) cyanoethylene disulphide | 12.6 |
| Furfural | 17.5 |
| Aqueous solution of sodium hydroxide (0.46 N) | 0.8 | were heated together under reflux at boiling temperature for 6 minutes. When a sample of the resulting resinous syrup was heated on a 140° C. hotplate, the resin became infusible almost immediately without the addition of any curing agent. The resin of this example is suitable for use in the preparation of molding compounds and molded articles.

Example 8

| | Parts |
|---|---|
| Alpha, beta-bis-(4,6-diamino pyrimidyl-2) cyanoethylene disulphide | 25.1 |
| Aqueous formaldehyde (approx. 37.1% HCHO) | 30.5 |
| Butyl alcohol | 27.9 |
| Aqueous solution of sodium hydroxide (0.46 N) | 1.5 |

All of the above ingredients with the exception of the butyl alcohol were heated together under reflux at boiling temperature for 5 minutes. The butyl alcohol was now added and refluxing was continued for an additional 10 minutes. The resulting resinous syrup was dehydrated by heating it on a steam plate. The dehydrated resin was soluble in ethylene glycol and Carbitol. It was partially soluble in butyl alcohol. The solubility and film-forming characteristics of the resinous composition of this example make it especially suitable for use in the production of spirit and baking varnishes. A sample of the dehydrated resin was applied to a glass plate and the coated plate was baked at 70° C. for several hours. A hard, opaque film was formed on the plate.

Example 9

| | Parts |
|---|---|
| Alpha, beta-bis-(4,6-diamino pyrimidyl-2) cyanoethylene disulphide | 12.6 |
| Acetamide | 4.4 |
| Aqueous formaldehyde (approx. 37.1% HCHO) | 24.3 |
| Aqueous solution of sodium hydroxide (0.46 N) | 1.5 | were heated together under reflux at boiling temperature for 11 minutes. Samples of the resulting resinous material were tested for the curing characteristics of the resin by adding various curing agents, followed by heating on a 140° C. hotplate. Relatively slow cures were obtained by the use of sodium chloroacetate, chloroacetamide, alpha, beta-dibromopropionitrile and a relatively quick cure with sulphamic acid. The plasticizing effect of the acetamide is evident from the slow cure of the heat-convertible resin. The resinous material of this example advantageously may be used as a modifier of rapidly curing aminoplasts to control their curing characteristics and to impart improved plastic flow thereto.

*Example 10*

| | Parts |
|---|---|
| Alpha, beta-bis-(4,6-diamino pyrimidyl-2) cyanoethylene disulphide) | 12.6 |
| Diethyl malonate | 6.0 |
| Aqueous formaldehyde (approx. 37.1% HCHO) | 24.3 |
| Aqueous solution of sodium hydroxide (0.46 N) | 0.5 | were heated together under reflux at boiling temperature for 15 minutes. When a sample of the resulting resinous syrup was placed on a 140° C. hotplate, the syrup bodied to a thermoplastic mass that remained thermoplastic upon further heating. The addition of curing agents such as chloroacetamide and trichloroacetamide to the syrupy condensation product or to the dehydrated resin caused the resin to cure slowly to an insoluble and infusible state. The addition of sulphamic acid or citric acid resulted in a relatively rapid cure of the resin to an insoluble and infusible state.

*Example 11*

| | Parts |
|---|---|
| Alpha, beta-bis-(4,6-diamino pyrimidyl-2) cyanoethylene disulphide | 12.6 |
| Polyvinyl alcohol | 1.7 |
| Aqueous formaldehyde (approx. 37.1% HCHO) | 24.3 |
| Aqueous solution of sodium hydroxide (0.46 N) | 1.0 |
| Water | 50.0 | were heated together under reflux at boiling temperature for 10 minutes. The resulting resinous syrup was potentially heat-curable as shown by the fact that when chloroacetamide, citric acid, sulphamic acid, hydrochloric acid and other curing agents such as mentioned under Example 1 were added to the resinous syrup, followed by heating on a 140° C. hotplate, the resin cured to an insoluble and infusible state. The resinous composition of this example may be used in the preparation of molding compositions or liquid coating compositions.

It will be understood, of course, by those skilled in the art that the reaction between the aldehyde and the disulphide may be effected at temperatures ranging, for example, from room temperature to the fusion or boiling temperature of the mixed reactants or of solutions of the mixed reactants, the reaction proceeding more slowly at normal temperatures than at elevated temperatures in accordance with the general law of chemical reactions. Thus, instead of effecting reaction between the ingredients of the above examples at boiling temperature under reflux as mentioned in the various examples, the reaction between the components may be carried out at temperatures ranging from room temperature up to the boiling temperature of the mass, using longer reaction periods and, in some cases, stronger catalysts and higher catalyst concentrations at the lower temperatures.

It also will be understood by those skilled in the art that our invention is not limited to condensation products obtained by reaction of ingredients comprising an aldehyde and the specific bis-(diamino diazinyl) cyanoalkylene disulphide named in the above illustrative examples. Thus, instead of alpha, beta-bis-(4,6-diamino pyrimidyl-2) cyanoethylene disulphide, we may use, for example, alpha, beta-bis-(2,6-diamino pyrimidyl-4) cyanoethylene disulphide, an alpha, alpha-bis-(diamino pyrimidyl) cyanoethylidene disulphide, a beta, beta-bis-(diamino pyrimidyl) cyanoethylidene disulphide or any other disulphide of the kind embraced by Formula I, numerous examples of which have been given above and in our copending application Serial No. 436,249.

In producing these new condensation products the choice of the aldehyde is dependent largely upon economic considerations and upon the particular properties desired in the finished product. We prefer to use as the aldehydic reactant formaldehyde or compounds engendering formaldehyde, e. g., paraformaldehyde, hexamethylene tetramine, etc. Illustrative examples of other aldehydes that may be used are acetaldehyde, propionaldehyde, butyraldehyde, acrolein, methacrolein, crotonaldehyde, benzaldehyde, glycollic aldehyde, glyceraldehyde, furfural, etc., mixtures thereof, or mixtures of formaldehyde (or compounds engendering formaldehyde) with such aldehydes. Illustrative examples of aldehyde-addition products that may be employed instead of the aldehydes themselves are the mono- and poly-(N-carbinol) derivatives, more particularly the mono- and poly-methylol derivatives, of urea, thiourea, selenourea and iminourea, and of substituted ureas, selenoureas, thioureas and iminoureas (numerous examples of which are given in D'Alelio copending application Serial No. 377,524), mono- and poly-(N-carbinol) derivatives of amides of polycarboxylic acids, e. g., maleic, itaconic, fumaric, adipic, malonic, succinic, citric, phthalic, etc.; mono- and poly-(N-carbinol) derivatives of the aminotriazoles, mono- and poly-(N-carbinol) derivatives of the aminotriazines, etc. Particularly good results are obtained with active methylene-containing bodies such as a methylol urea, more particularly mono- and di-methylol ureas, and a methylol melamine, e. g., monomethylol melamine and polymethylol melamines (di-, tri-, tetra-, penta- and hexa-methylol melamines). Mixtures of aldehydes and aldehyde-addition products may be employed, e. g., mixtures of formaldehyde and methylol compounds such, for instance, as dimethylol urea, trimethylol melamine, hexamethylol melamine, etc.

The ratio of the aldehydic reactant to the disulphide may be varied over a wide range. Ordinarily these reactants are employed in an amount corresponding to at least one mol of the aldehyde, specifically formaldehyde, for each mol of the disulphide. Thus, we may use, for example, from 1 to 12 or 15 or more mols of an aldehyde for each mol of the disulphide. When the aldehyde is available for reaction in the form of an alkylol derivative, more particularly a methylol derivative such, for instance, as dimethylol urea, trimethylol melamine, etc., then higher amounts of such aldehyde-addition products are used, for instance from 2 or 3 up to 25 or 30 or more mols of such alkylol derivatives for each mol of the disulphide.

As indicated hereinbefore, and as further shown by a number of the examples, the properties of the fundamental resins of this invention may be varied widely by introducing other modifying bodies before, during or after effecting condensation between the primary components. Thus, as modifying agents we may use, for instance, monohydric alcohols such as ethyl, propyl, isopropyl, butyl, isobutyl, hexyl, etc., alcohols; polyhydric alcohols such as diethylene glycol, triethylene glycol, pentaerythritol, etc.; amides such as formamide, stearamide, acrylamide, benzamide, benzene sulphonamides, toluene sulphonamides, adipic diamide, phthalamide, etc.; amines such as ethylene diamine, phenylene diamine, etc.; phenol and substituted phenols, including aminophenols, etc.; ketones, including halogenated ketones; nitriles, including halogenated nitriles, e. g., acrylonitrile, methacrylonitrile, succinonitrile, chloroacetonitriles, etc.; acylated ureas, more particularly halogenated acylated ureas of the kind described, for example, in D'Alelio copending applications Serial No. 289,273, filed August 9, 1939, now Patent No. 2,281,559, issued May 5, 1942, and Serial No. 400,649, filed July 1, 1941, now Patent No. 2,294,873, issued September 1, 1942; and others.

The modifying bodies also may take the form of high molecular weight bodies with or without resinous characteristics, for example hydrolyzed wood products, formalized cellulose derivatives, lignin, protein-aldehyde condensation products, aminotriazine-aldehyde condensation products, aminotriazole-aldehyde condensation products, etc. Other examples of modifying bodies are the urea-aldehyde condensation products, the aniline-aldehyde condensation products, furfural condensation products, phenol-aldehyde condensation products, modified or unmodified, saturated or unsaturated polyhydric alcohol-polycarboxylic acid condensation products, water-soluble cellulose derivatives, natural gums and resins such as shellac, rosin, etc.; polyvinyl compounds such as polyvinyl esters, e. g., polyvinyl acetate, polyvinyl butyrate, etc., polyvinyl ethers, including polyvinyl acetals, specifically polyvinyl formal, etc.

Instead of effecting reaction between a diazinyl compound of the kind herein described and an aldehyde, e. g., formaldehyde, we may cause an aldehyde to condense with a salt (organic or inorganic) of the diazinyl compound or with a mixture of the diazinyl compound and a salt thereof. Examples of organic and inorganic acids that may be used in the preparation of such salts are hydrochloric, sulphuric, phosphoric, boric, acetic, chloroacetic, propionic, butyric, valeric, acrylic, oxalic, methacrylic, polymethacrylic, malonic, succinic, adipic, malic, maleic, fumaric, benzoic, salicylic, phthalic, camphoric, etc.

Dyes, pigments, plasticizers, mold lubricants, opacifiers, curing agents and various fillers (e. g., wood flour, glass fibers, asbestos, including defibrated asbestos, mineral wool, cloth cuttings, etc.) may be compounded with the resin in accordance with conventional practice to provide various thermoplastic and thermosetting molding compositions.

The unmodified and modified resinous compositions of this invention have a wide variety of uses. For example, in addition to their use in the production of molding compositions, they may be used as modifiers of other natural and synthetic resins, as laminating varnishes in the production of laminated articles wherein sheet materials, e. g., paper, cloth, sheet asbestos, etc., are coated and impregnated with the resin, superimposed and thereafter united under heat and pressure. They may be used in the production of wire or baking enamels from which insulated wires and other coated products are made, for bonding or cementing together mica flakes to form a laminated mica article, for bonding together abrasive grains in the production of resin-bonded abrasive articles such, for instance, as grindstones, sandpapers, etc., in the manufacture of electrical resistors, etc. They also may be employed for treating cotton, linen and other cellulosic materials in sheet or other form. They also may be employed as impregnants for electrical coils and for other electrically insulating applications.

What we claim as new and desire to secure by Letters Patent of the United States is:

1. A composition of matter comprising the reaction product of ingredients comprising (1) an aldehyde and (2) a compound corresponding to the general formula

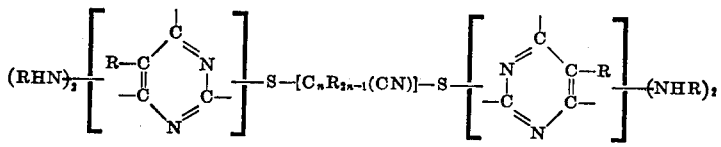

where $n$ represents an integer and is at least 1 and not more than 2, and R represents a member of the class consisting of hydrogen and monovalent hydrocarbon and halohydrocarbon radicals.

2. A composition as in claim 1 wherein the reaction product is the product obtained by effecting initial reaction between the specified components under alkaline conditions.

3. A composition as in claim 1 wherein the aldehyde is formaldehyde.

4. A composition as in claim 1 wherein R in the formula of the compound of (2) represents hydrogen.

5. A composition of matter comprising the reaction product of ingredients comprising (1) an aldehyde and (2) a compound corresponding to the general formula

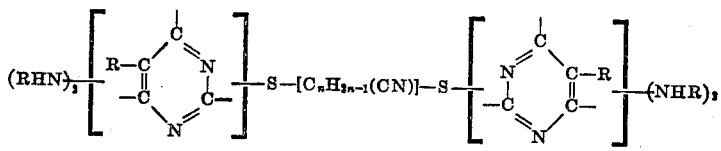

where $n$ represents an integer and is at least 1 and not more than 2, and R represents a member of the class consisting of hydrogen and monovalent hydrocarbon and halo-hydrocarbon radicals.

6. A heat-curable resinous composition comprising a heat-convertible condensation product of ingredients comprising (1) formaldehyde and (2) a compound corresponding to the general formula

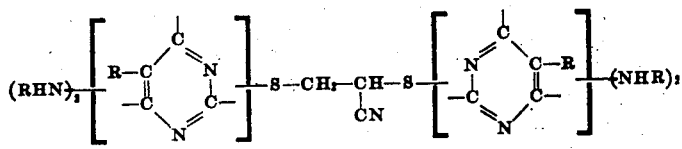

where R represents a member of the class consisting of hydrogen and monovalent hydrocarbon and halo-hydrocarbon radicals.

7. A product comprising the cured resinous composition of claim 6.

8. A resinous composition comprising the product of reaction of ingredients comprising an aldehyde and a bis-(diamino pyrimidyl) cyanomethylene disulphide.

9. A composition comprising the resinous condensation product of ingredients comprising an aldehyde and a bis-(diamino pyrimidyl) cyanoethylene disulphide.

10. A resinous composition comprising the product of reaction of ingredients comprising formaldehyde and alpha, beta-bis-(4,6-diamino pyrimidyl-2) cyanoethylene disulphide.

11. A composition comprising the product of reaction of ingredients comprising a urea, an aldehyde and a compound corresponding to the general formula of the compound of (2) of claim 1.

12. A composition comprising the resinous product of reaction of ingredients comprising urea, an aldehyde and a compound corresponding to the general formula of the compound of (2) of claim 5.

13. A composition comprising the product of reaction of ingredients comprising a phenol, an aldehyde and a compound corresponding to the general formula of the compound of (2) of claim 1.

14. A resinous composition comprising the product of reaction of ingredients comprising an aminotriazine, an aldehyde and a compound corresponding to the general formula of the compound of (2) of claim 1.

15. A heat-curable composition comprising the heat-convertible resinous reaction product of (a) a partial condensation product of ingredients comprising formaldehyde and a compound corresponding to the general formula of the compound of (2) of claim 1, and (b) a curing reactant.

16. A composition comprising the resinous reaction product of (a) a partial condensation product of ingredients comprising formaldehyde and a compound corresponding to the general formula of the compound of (2) of claim 5, and (b) a chlorinated acetamide.

17. A composition comprising the product of reaction of ingredients comprising urea, formaldehyde and alpha, beta-bis-(4,6-diamino pyrimidyl-2) cyanoethylene disulphide.

18. A resinous composition comprising the product of reaction of ingredients comprising dimethylol urea and alpha, beta-bis-(4,6-diamino pyrimidyl-2) cyanoethylene disulphide.

19. A composition comprising the resinous product of reaction of (1) a partial condensation product of ingredients comprising urea, formaldehyde and alpha, beta-bis-(4,6-diaminio pyrimidyl-2) cyanoethylene disulphide and (2) a chlorinated acetamide.

20. The method of preparing new condensation products which comprises effecting reaction between ingredients comprising an aldehyde and a compound corresponding to the general formula

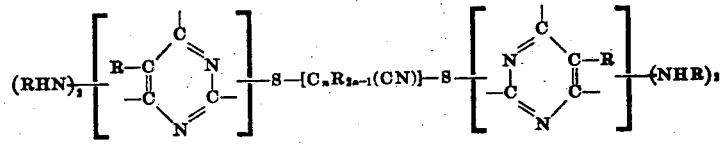

where $n$ represents an integer and is at least 1 and not more than 2, and R represents a member of the class consisting of hydrogen and monovalent hydrocarbon and halo-hydrocarbon radicals.

GAETANO F. D'ALELIO.
JAMES W. UNDERWOOD.